July 12, 1949.　　　　E. C. PARSONS　　　　2,475,635
MULTIPLE CONDUIT
Filed Jan. 8, 1945　　　　2 Sheets-Sheet 1
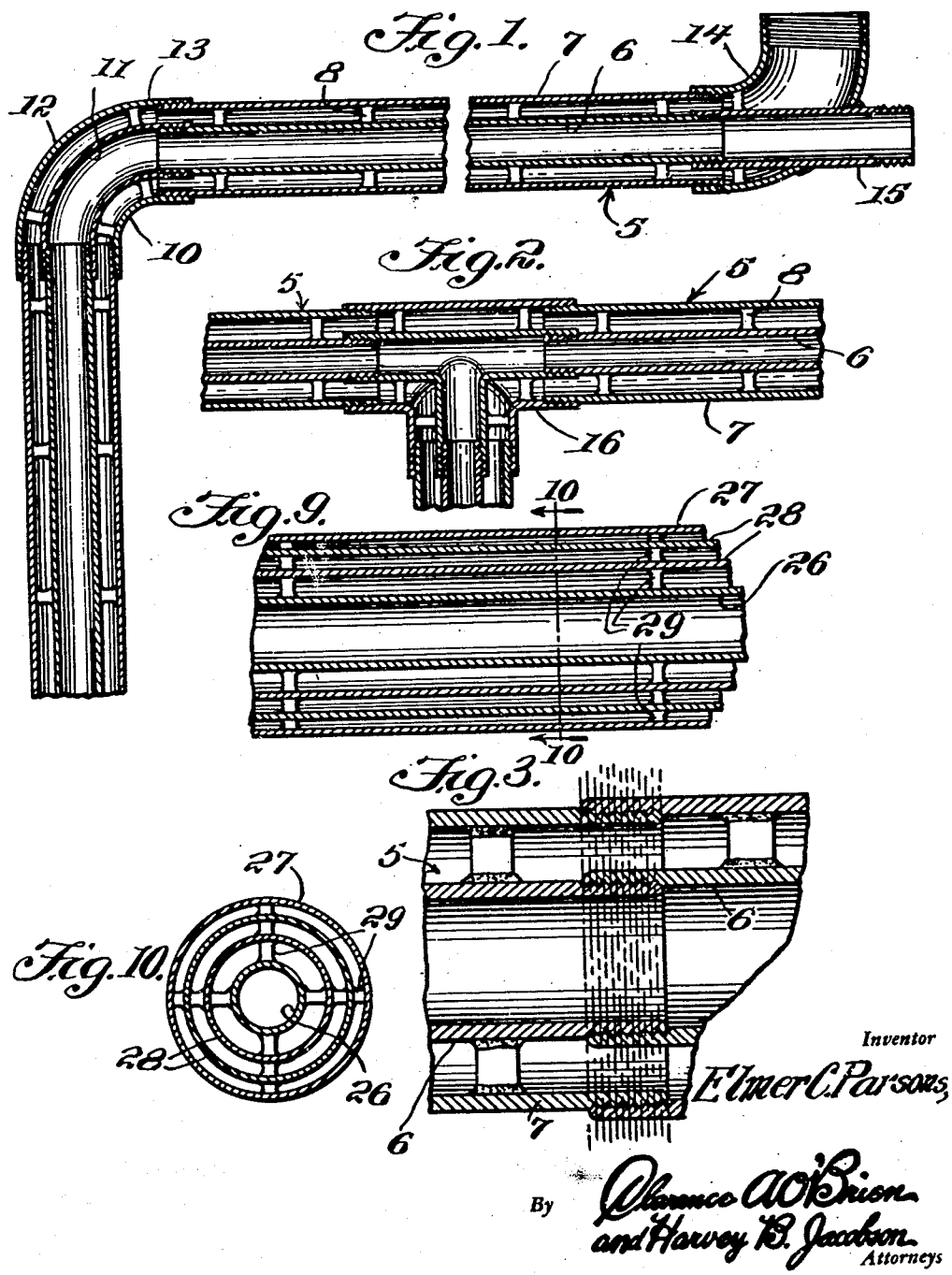
Inventor
Elmer C. Parsons,
By Clarence A. O'Brien
and Harvey B. Jacobson
Attorneys July 12, 1949.                E. C. PARSONS                 2,475,635
                              MULTIPLE CONDUIT
Filed Jan. 8, 1945                                   2 Sheets-Sheet 2
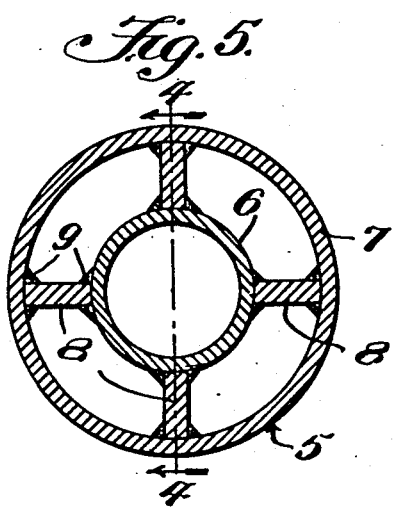
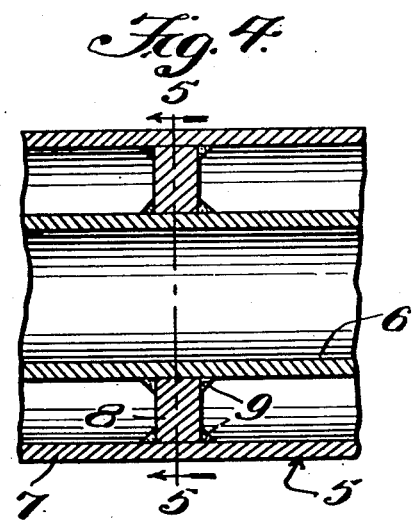
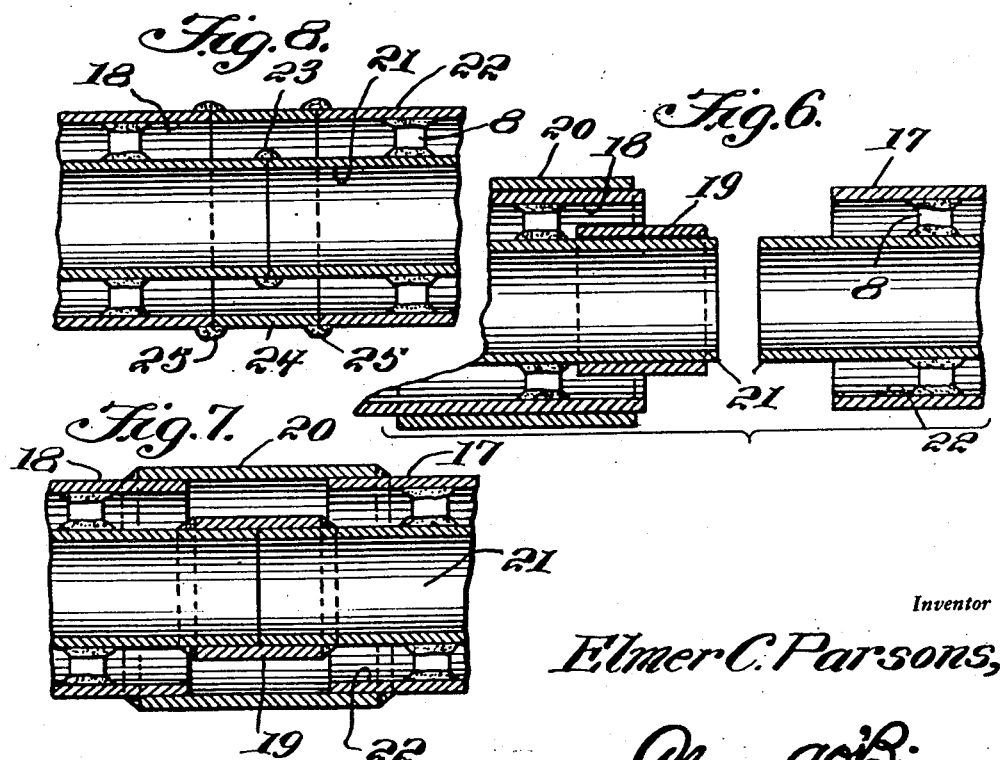
Inventor
Elmer C. Parsons,
By
Attorneys Patented July 12, 1949

2,475,635

UNITED STATES PATENT OFFICE 2,475,635

MULTIPLE CONDUIT

Elmer C. Parsons, Brainerd, Minn.

Application January 8, 1945, Serial No. 571,806

3 Claims. (Cl. 138—65)

The present invention relates to new and useful improvements in multiple conduits and more specifically to a pipe construction composed of inner and outer coaxial pipe units together with means for spacing the inner pipe within the walls of the outer pipe and also to provide means for connecting sections of the inner and outer pipe units to each other.

An important object of the present invention is to provide a pipe construction by means of which several fluids may pass through the pipe without contact with each other, the invention being particularly adapted for use in steam and hot water heating plants whereby fluid from the feed and return lines may pass through a single conduit, and the invention is also adapted for use in oil pipe lines where a plurality of different types of oil are fed through the pipes and also in which one of the pipes may be used for conveying a heating fluid to facilitate the flow of the oil in cold temperature.

A further object of the invention is to provide a device of this character of simple and practical construction, which is efficient and reliable in performance, relatively inexpensive to manufacture and install in use and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal sectional view through a multiple pipe embodying one form of the invention.

Figure 2 is a similar view illustrating the use of a T-fitting for connecting the sections of the pipe.

Figure 3 is an enlarged fragmentary sectional view illustrating a threaded connection for the inner and outer pipes.

Figure 4 is an enlarged fragmentary sectional view illustrating the spacing lug for the inner and outer pipes.

Figure 5 is a transverse sectional view taken substantially on a line 5—5 of Figure 4.

Figure 6 is a fragmentary longitudinal sectional view illustrating a sleeve pipe union for the inner and outer pipes.

Figure 7 is a similar view showing the manner in which the sleeve unions are welded to the respective pipes.

Figure 8 is a fragmentary longitudinal sectional view illustrating a welded joint for the pipe sections.

Figure 9 is a fragmentary longitudinal sectional view of a modified multiple pipe construction, and Figure 10 is a transverse sectional view taken substantially on a line 10—10 of Figure 9.

Referring now to the drawings in detail and first with respect to the form of the invention illustrated in Figures 1 to 5, inclusive, the numeral 5 designates a section of the conduit generally which is composed of an inner pipe section 6 and an outer pipe section 7, the inner and outer pipe sections being arranged in coaxial relation and the inner pipe section being secured in spaced relation from the walls of the outer pipe section by means of lugs 8 preferably cast with the pipe, or which may be welded in position as shown at 9 in Figures 4 and 5.

The inner and outer pipe sections have their ends externally threaded for simultaneous threaded engagement with the ends of an elbow 10 as shown in Figure 1 of the drawings which likewise include inner and outer pipe sections 11 and 12 secured in spaced relation one within the other by means of the lugs 13. One end of the pipe section may also be provided with an elbow of a type shown at 14 in Figure 1 and having an inner pipe section 15 connected to the end of the inner pipe section 6 and extending outwardly through the wall of the elbow to provide an outlet for the fluid passing through the inner pipe section.

In Figure 2 of the drawings I have illustrated the use of a T-fitting 16 for connecting the adjacent ends of the pipe sections.

As shown in Figures 6 and 7 of the drawings, the pipe sections 17 and 18 may be connected by inner and outer sleeve joints 19 and 20 slidably mounted on the respective inner and outer pipe sections, the inner pipe sections 21 projecting outwardly beyond the outer pipe sections 22 to facilitate the welding of the inner sleeve in position as shown in Figure 7.

Also, if desired, the adjacent ends of the inner pipe sections may be directly welded to each other as shown at 23 and the ends of the outer pipe sections 22 connected by a filler section 24 of a diameter corresponding to that of the outer pipe section and welded thereto as at 25.

In Figures 9 and 10 of the drawings the inner pipe section 26 and outer pipe section 27 are provided with one or more intermediate pipe sections 28, all secured in coaxial spaced relation by means of the lugs 29 so that an increased number of fluids of different type may pass through a common conduit.

From the foregoing it will be apparent that the inner and outer pipes as shown in Figures 1 to 8, inclusive, may be used as the feed and return lines in steam or hot water heating plants whereby to reduce the number of conduits generally employed for this purpose and the form of the invention illustrated in Figures 9 and 10 may be employed as an oil pipe line wherein several different types of oil may be simultaneously pumped through a single conduit without contact with each other and also in which one of the pipe sections may contain a heated fluid for heating the oil.

Usual expansion and contraction is provided for by conventional expansion joints, adapted to fit a multiple pipe conduit.

It is believed that the details of construction and manner of use of the device will be readily understood from the foregoing without further detailed explanation.

Having thus described the invention, what I claim is:

1. In a conduit, coaxial pipe sections arranged one inside another, and an elbow coupling on one end of one section having a pipe section extending into the same through one side thereof and connected to one end of another pipe section.

2. In a conduit, a pair of outer pipe sections having confronting ends spaced apart, a pair of inner pipe sections in said outer pipe sections extending out of said ends of the outer pipe sections and having confronting ends abutting each other, and separate coupling sleeves connecting the confronting ends of the outer pipe sections and the confronting ends of the inner pipe sections respectively.

3. In a conduit, a pair of outer pipe sections having confronting ends spaced apart, a pair of inner pipe sections in said outer sections extending out of said ends of the outer pipe sections and having confronting ends abutting each other and welded together, and a spacer sleeve between the spaced apart ends of the outer pipe sections welded thereto, said outer pipe sections and said sleeve being of the same diameter.

ELMER C. PARSONS.

REFERENCES CITED

The following references are of record in the file of this patent:

UNITED STATES PATENTS

| Number | Name | Date |
| --- | --- | --- |
| 136,952 | Austin | Mar. 18, 1873 |
| 140,165 | Richardson | June 24, 1873 |
| 353,680 | Hurlbut | Dec. 7, 1886 |
| 412,255 | Hattery | Oct. 8, 1889 |
| 417,992 | Dell | Dec. 24, 1889 |
| 1,160,703 | Fleming | Nov. 16, 1915 |
| 1,481,255 | Cumfer | Jan. 22, 1924 |
| 1,521,482 | Steele | Dec. 30, 1924 |
| 1,909,075 | Ricker et al. | May 16, 1933 |
| 1,977,987 | Corby | Oct. 23, 1934 |

FOREIGN PATENTS

| Number | Country | Date |
| --- | --- | --- |
| 679,867 | France | Jan. 14, 1930 |